Figure 1:
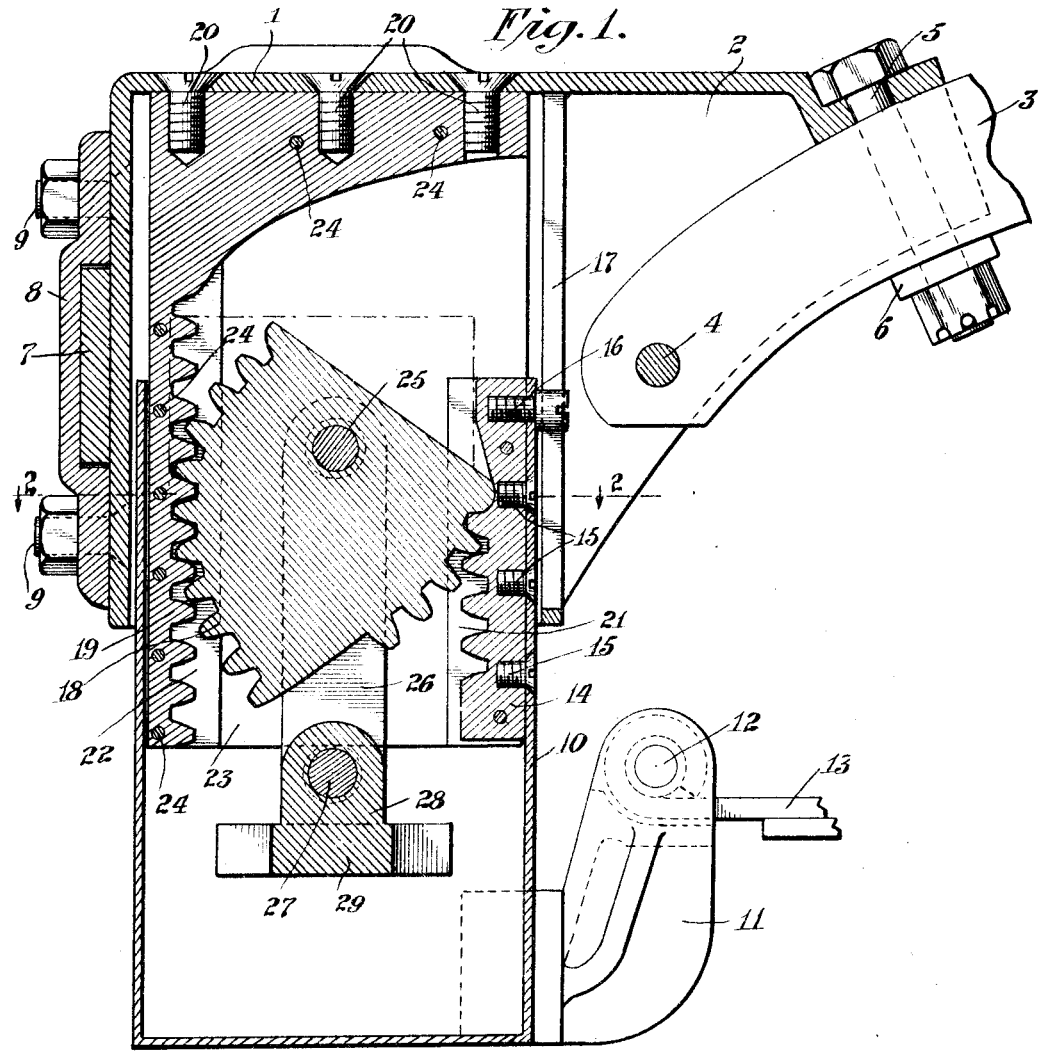

Oct. 23, 1928.

L. D. GREGG 1,689,023

CONNECTING DEVICE

Filed March 6, 1926

4 Sheets-Sheet 1

Louis D. Gregg
INVENTOR

BY W. B. Whitney
ATTORNEY

Oct. 23, 1928.

L. D. GREGG 1,689,023

CONNECTING DEVICE

Filed March 6, 1926

4 Sheets-Sheet 3

Louis D. Gregg
INVENTOR

BY W. B. Whitney
ATTORNEY

Oct. 23, 1928.

L. D. GREGG 1,689,023

CONNECTING DEVICE

Filed March 6, 1926 4 Sheets-Sheet 4

Louis D. Gregg
INVENTOR

BY W. B. Whitney
ATTORNEY

Patented Oct. 23, 1928.

1,689,023

UNITED STATES PATENT OFFICE.

LOUIS D. GREGG, OF HACKENSACK, NEW JERSEY.

CONNECTING DEVICE.

Application filed March 6, 1926. Serial No. 92,664.

This invention relates to a connection between two parts by which they are yieldingly joined so that under normal pressures they will be held suitably spaced apart but one or both thereof will be movable within limits to and from the other; and, while of general application, is of special value for use as a so-called shock absorber between the body and running gear of a vehicle, such for example as an automobile or motor truck, where it is highly desirable that the vertical movement of the axles produced in running rapidly over inequalities in the roadway shall affect as little as possible the vertical position of the body.

Of the various devices heretofore employed for the purpose the most common are those based on the cushioning effect of metallic springs of coil or loop formation, or which utilize the elastic properties of metals, rubber, etc., or of gases such as air. But all prior devices have proven only partially successful, due to the fact that the compressible element used transmits substantially increased or decreased pressure as it is compressed or permitted to expand by the motion of one of the parts, the axle in the case of a vehicle, which is subject to sudden movement and such increased or decreased pressure, transmitted to the body or other part, causes an undesirable movement thereof.

My new connecting device, by which I have obviated the above-mentioned defect in prior devices of this character, comprises, as its principal novel feature, means for maintaining the normal pressure transmitted from one part to the other substantially constant—i. e., constant except for such small variations as are due to friction or inertia of movable parts—under changes in the pressure on or in the relative position of one of the connected parts. Thus, for example, the sudden rise or fall of the axle of a vehicle, within the limits of movement for which the device is designed, will not affect the upward pressure upon and hence will not produce any vertical movement of the body.

It is usually desirable, however, that when an automobile strikes a sudden rise or fall in the roadway which continues for some distance at approximately the same higher or lower level the body shall be gradually raised or lowered, as the case may be, to thereby restore the parts to their normal spaced relationship. Accordingly, I provide, as an additional feature, means for slightly increasing the normal upward pressure of the axle upon the body, to gradually elevate the body, whenever, as on a sustained rise of the axle, the parts are brought closer together than the predetermined normal distance and for slightly decreasing such pressure and so allowing the body gradually to drop as the parts move and remain apart beyond the predetermined normal distance on a prolonged drop of the axle.

Moreover, in the case of an automobile or similar vehicle, the pressure transmitted between the axle and the body is in proportion to the combined weight both of the body and of the load carried thereby; and they are designed, as three, five and seven passenger cars and five or ten ton trucks, to carry certain normal loads and will run most smoothly when so loaded. Hence, since this load variation may be considerable, as when for example only one or two persons are riding in a large car or extra passengers crowd into the car, it is advisable to provide, and I have accordingly incorporated in my new connecting device as a still further feature thereof, means operable automatically for the adjustment of the pressure transmitting means so as normally to maintain the body at the intended height above the axle.

One practical embodiment of the invention and several equivalent means for obtaining the desired result are shown, by way of illustration and not of limitation, in the accompanying drawings, in which—

Figure 2:
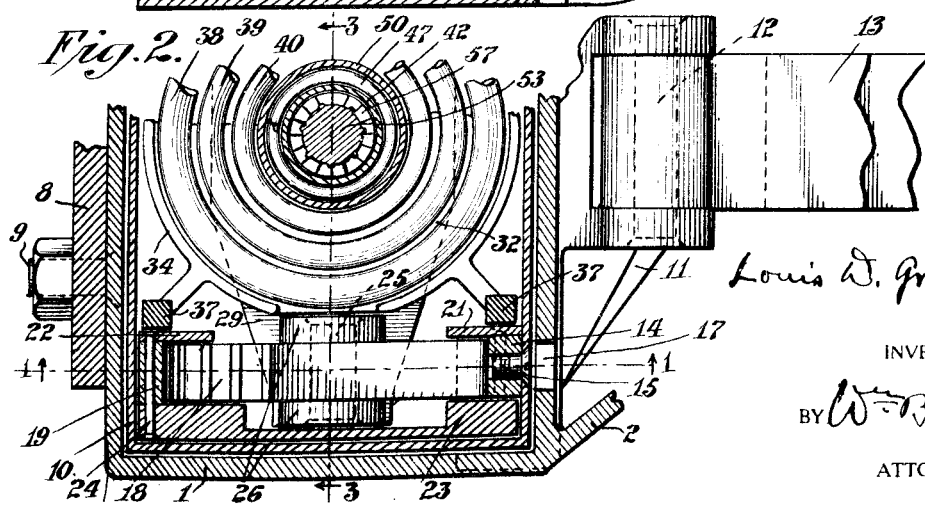
Figure 3:
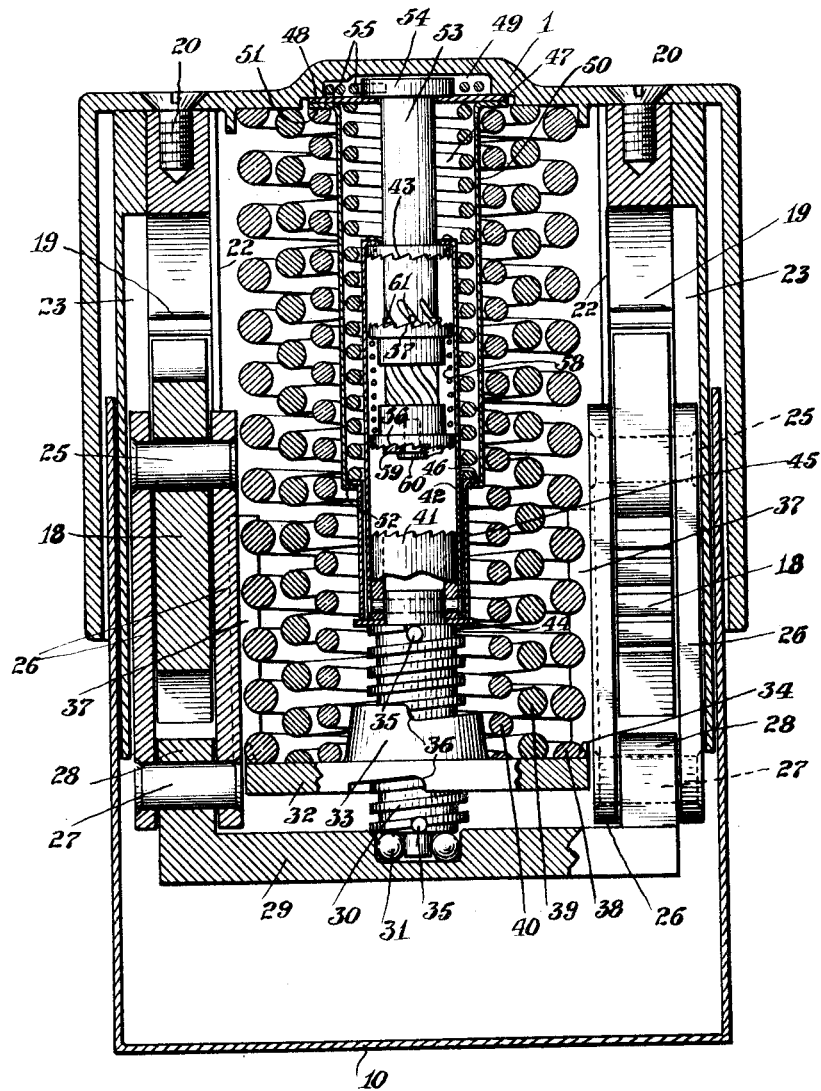
Figure 4:
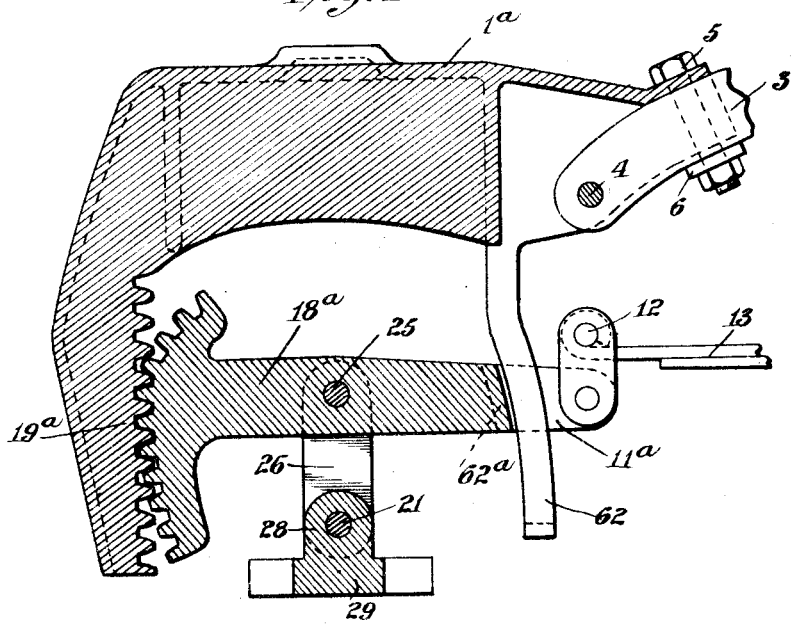
Figure 5:
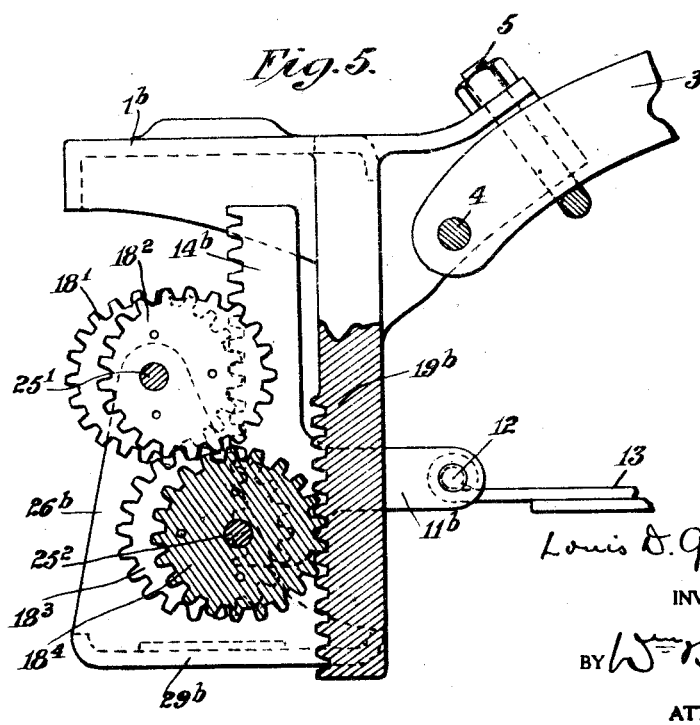
Figure 6:
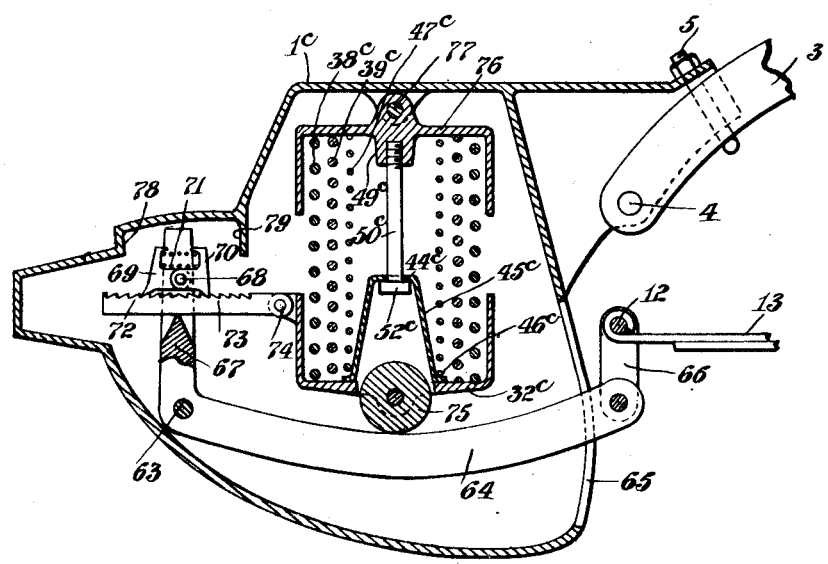
Figure 7:
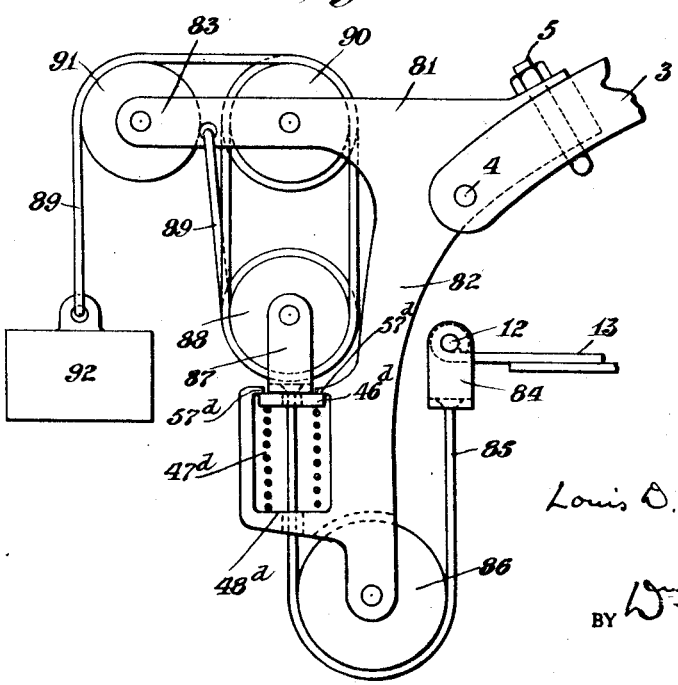

Figure 1 is a view, in vertical section on the line 1 1 of Fig. 2 but with certain of its parts omitted, of a connecting device in which are combined the several features of my invention, showing the same as applied to, and connecting, the ends of a body frame-member and a spring attached to an axle on one side of a motor vehicle; Fig. 2 is a view of one-half or side of the device showing the same in horizontal section on the line 2 2 of Fig. 1; Fig. 3 is a view of the complete device in vertical section on the line 3 3 of Fig. 2; Fig. 4 is a sectional view, corresponding to Fig. 1, showing a modified form of certain of the elements of the pressure transmitting means there illustrated; Fig. 5 is a sectional view, also corresponding to Fig. 1, showing a further modification of elements comprising the pressure transmitting means; Fig. 6 is a view, in central vertical section, of a connecting device embodying a still further modification of the invention; and Fig. 7 is a view showing, in side elevation and more or less diagrammatically, equivalent gravity-actuated means for maintaining constant the pressure transmitted between an axle and the body of an automobile.

Referring first to Figs. 1–3 of the drawings, the upper casing 1 of the connecting device, preferably a casting, is provided with an integral bracket-arm 2 by which it is rigidly attached, at the corner of an automobile, to the end of a side body frame-member 3, as by bolt 4 and two bolts 5 which straddle the frame-member and pass through a strap-plate 6. To the outer side of this casing may be attached, on each side of the automobile, the end 7 of a bumper, of the usual or any suitable type, by means of a clamp 8 and bolts 9. A lower casing 10, which is open at its upper end and telescopes within the lower open end of the upper casing, carries a bracket-arm 11 by which it is pivotally connected, by a bolt 12, with the end of a semi-elliptical spring 13 attached to an axle (not shown) of the vehicle. This lower casing, which preferably is oil tight, may be a casting or may be made of plates which are bent square at certain corners and welded at others or welded at all corners; and the attachment bracket may be cast integral with the casing, if a casting, or may be separately cast or forged and welded or otherwise secured thereto as may be found most convenient.

On each side of the lower casing a gear rack 14, which is really a combination pivot and rack, is rigidly secured to the inner face of its inner wall by screws 15 and 16, the screw 16 being provided with a head which slides within a vertical guide-slot 17 formed, on each side, in the inner wall of the upper casing. In operative engagement with each of the two racks 14 is a gear 18, a combined lever and gear, which may be said to be pivoted on rack 14 when the latter is in its lower positions and to mesh as a gear therewith when the latter is in its upper positions. The opposite or outer side of each of the two gears 18 meshes as a gear with the teeth of a rack 19 which, on each side of the casing, is attached by screws 20 to the inner face of the top or cover. The proportions of the gear 18 and the teeth of the two racks with which it engages are such as to keep the rack 14 at a fixed distance from the rack 19 for all working positions of the gear. Each of the gears 18 operates in guideways formed respectively by guide-plates 21 and 22 riveted to the inner side of the racks 14 and 19, and the inner side of a slide-plate 23 which is riveted to the outer side of rack 19 by rivets 24 and, its vertical edges slidingly fitting the inner corners of the lower casing with a clearance less than that between the lower and the upper casing, serves to keep the two casings out of frictional engagement; and each gear is linked, by double links 26 pivoted to the gear by pin 25 and by pin 27 to a lug 28, to an end of a cross-beam 29. An adjustment screw 30 is mounted through a thrust bearing 31 centrally on the cross-beam and in turn adjustably supports a spring seat 32, provided with central boss 33 and outer rim 34, which is threaded on said screw and the vertical travel of which is limited by upper and lower pins 35, fixed in the screw, and upper and lower shoulders 36 formed on the spring seat, further rotation of the screw in the same direction being stopped by the engagement of a pin with one or the other of the shoulders. The spring seat carries on radial arms four upright guide-members 37 each of which is in sliding engagement with an inner wall of the lower casing and one of the guide-plates 21 or 22. Nested coil compression springs 38, 39 and 40, suitably proportioned, bear at their lower ends against the spring seat 32 and at their upper ends against the top of the upper casing, the two outer springs directly and the inner spring 40 indirectly through the flange 51 of a sleeve 50 and a washer 48 which is seated upon the annular shoulder of a socket or depression 49 formed in the top of the casing.

The adjustment screw carries riveted to its reduced upper end a sleeve-ratchet 41 and sleeve 42, the latter carrying a reversed sleeve-ratchet 43 riveted to its inwardly flanged upper end, which serve in turn to hold a washer 44 down upon the shoulder of the screw. A second sleeve 45, surrounding sleeve 42, rests at its lower end upon the washer 44 and at its upper end has an outturned flange 46 between which flange and the washer 48 is interposed a coil compression spring 47. The sleeve 50, already mentioned, encloses the spring 47 and has at its lower end an inturned flange 52 which engages the flange 46 of sleeve 45. A second or actuating screw 53 is supported at its upper end, which passes through a central opening in the washer 48, by a head 54 bearing against the washer below and the top of the casing above, and is yieldingly held against rotation by a flat coil spring 55 which is fixed at its inwardly-bent inner end in a hole in the head and at its downwardly-bent outer end in openings in the washer 48 and flange 51. This actuating screw, extending downwardly through the sleeve-ratchet 43, is provided at and near its lower end with steep-pitched threads which operatively engage the complementary threads of the lower and upper internally threaded sleeve-ratchets 56 and 57 and cause these ratchets to rotate axially of the screw whenever they are forced up or down thereon. The two reversed rotating ratchets, which are arranged in co-operative relationship with the ratchets 41 and 43 respectively, are yieldingly held apart by a ...t coil compression spring 58 and are limited in their vertical movement upon the screw, the lower ratchet in its downward movement by a washer 59 fixed by a screw to the lower end of the actuating screw and the upper ratchet in its upward movement by pins 61 set into the screw threads at their upper end. The washer 59 may be pinned to the actuating screw and have a spring projection which will bear against the square head of screw 60 and so lock it against working loose. Both the washer and the actuating screw are small enough to pass down within the sleeve of ratchet 41.

The lower casing is preferably filled with a light lubricating oil, which will lubricate all the bearing surfaces except the few located above the washer 48, and these, because of their simplicity and the infrequency of their movement, should not require much if any lubrication. The walls of the several sleeves may be perforated with suitable openings (not shown) to readily permit the movement of the lubricant into all enclosed places.

The device is easily assembled by first inserting the cross-beam 29 with the gears 18 linked thereto and the racks 19 into the lower casing to which the racks 14 have been secured by the screws 15, then dropping into position the other parts previously assembled, and finally putting on and pressing down the upper casing and inserting the screws 20 into the racks 19 and the screws 16 into the racks 14.

The vertical movement of the lower within the upper casing is limited in one direction by the striking of its upper edges against the top or cover of the latter and in the other direction by the engagement of the heads of the screws 16 with the lower end of the slots 17.

The operation of the device as applied to an automobile, its parts being suitably proportioned so that they will normally be positioned as shown when the automobile carrying its designed load is standing still or is running on a smooth roadway, is as follows:

The pressures transmitted to and from the body and axle or axle-spring of the car are transmitted principally through the springs 38, 39 and 40. These springs are compressed by the weight of the loaded car pressing downwardly and the counter upward pressure of the axle-spring and they in turn bear upwardly against the upper casing and the body supported thereon and downwardly upon the spring seat 32 and the gears 18 pivotally linked thereto and through the left hand side of the gears and the racks 19 on the upper casing and body and through the right hand side of the gears and the racks 14 on the lower casing and the axle-spring. The force of the springs varies as they are compressed or extended; and, in the normal position shown where the forces are all in equilibrium, they are so compressed that the force of their upward pressure on the upward casing less that part of their downward pressure which is exerted on the upper casing through the racks 19 is met and counter-balanced by the remainder of their downward pressure acting through the racks 14 and the lower casing on the axle-spring. On a sudden rise of the axle, which because of the inertia of the body above compresses the axle-spring 13, the additional force thus given to the axle-spring increases the upward pressure on the lower casing and racks 14 and the upward pressure of the racks acting on the gears 18 as levers fulcrumed on the racks 19 overcomes the downward pressure of the springs 38, 39 and 40 and raises the pivot-pins 25 and through them the spring seat 32. The change in the force of the springs is substantially constant for each inch of compression or extension and may be calculated, and both the springs and gears are so proportioned that as the pivot-pins 25 are raised in the compression of the springs they are correspondingly shifted away from the racks 14 and towards the racks 19, with the result that substantially all of the increase in the upward pressure of the springs on the upper casing is offset by the increase of their downward pressure thereon through the gears and racks 19. Both the net upward pressure of the springs on the upper casing and their downward pressure through the gears and racks 14 on the lower casing remain substantially as they were. Conversely, when a drop of the axle relieves the axle-spring and so reduces the upward pressure on the lower casing, the springs 38, 39 and 40 expand and the consequent lowering of the pins 25 shifts these pins back from the racks 19 and towards the racks 14 and so changes the leverage through which the downward pressure of the springs is exerted that the resultant pressures are left unchanged. The pressures transmitted from one casing to the other therefore remain substantially constant whatever the relative position of the casings may be, and consequently no substantial change in the vertical position of the body will be produced either by a rise or fall of the axle within the limits permitted by the device.

The action of the springs 38, 39 and 40, is however, somewhat modified by the additional spring 47 which, whenever the lower casing is above its normal position as shown, is compressed by the raising of the sleeve 45 by the washer 44 and so supplements the action of these springs, but, when the casing drops below its normal position, is held against further expansion by the sleeve 50, sleeve 45 then separating from the washer 44. Hence, the springs 38, 39 and 40 are here so proportioned as to exert a predetermined pressure slightly less than that required to support the load on the upper casing in normal position, which deficiency in pressure may be designated as the upward normalizing pressure, and the spring 47 is proportioned to have say double such normalizing pressure and therefore exerts a net downward normalizing pressure equal to the upward normalizing pressure. The consequent result is that, with the normal load on the upper casing, the normalizing pressure, always tending to return the parts to their predetermined normal position relative to each other, will slowly and gradually raise or lower the upper casing and body whenever the axle, after a sudden rise or drop, remains for a time at the new level. If desired, however, the upward normalizing presure may be made either greater or smaller than the downward normalizing pressure by suitably varying the proportions of the springs.

The operation of the means further provided for the adjustment of the tension of the springs to varying body loads of passengers or freight is as follows: The action of the screw connection between the adjustment screw 30 and spring seat 32 is non-reversible—that is to say, the pitch of the screw threads is so low that the friction of the parts will prevent the downward pressure of the springs on the spring seat from turning the screw. The ratchets 41 and 43 move up and down with the lower casing and, at predetermined positions of the casing, either ratchet 41 will engage the ratchet 56 or ratchet 43 will engage the ratchet 57; and a further movement of the casing, beyond these positions, will move one or the other of the ratchets 56 and 57 axially of the actuating screw 53 and the ratchet will be rotated by the steep pitch threads of the screw and in turn will rotate the ratchet in engagement therewith and through it the adjustment screw, thereby either raising or lowering the spring seat 32 with respect to the screw 30. For example, after ratchet 56 has been engaged by ratchet 41 it will be rotated in a counter clock-wise direction by the further upward movement of the lower casing and, acting through the ratchet teeth, will turn the adjustment screw so as to raise the spring seat 32 and add to the normal compression of the springs 38, 39, and 40, thus increasing the pressure transmitted from the lower to the upper casing. The lower casing may or may not reach the extreme upper limit of its movement within the upper casing, but, if the upward movement is interrupted by a downward movement, the teeth of ratchet 56 will slip on those of ratchet 41 as it is moved downwardly by the spring 58 and reversely rotated on the threads of the actuating screw, the spring 58 being so light as to allow the teeth to slip without communicating any turning movement to the adjustment screw. Thus, the effect of the latter part of the upward movement of the lower casing within or relative to the upper casing will be to increase the normal compression and force of the springs 38, 39 and 40; and, if the increased pressure exerted thereby is not sufficient to equal the super-normal load, the lower casing will remain at its extreme upper limit until the car encounters a drop in the roadway which will allow the lower casing to drop sufficiently for the ratchet 56 to slip one or more teeth on ratchet 41, whereupon the springs will be further compressed when the lower casing moves upward again. Each similar jiggle of the car body will increase the compression of the springs until the power exerted thereby exceeds that required to support the load on the upper casing. The action is just the reverse of this when a drop of the lower casing brings the ratchet 43 into operative engagement with the ratchet 57; and whenever a violent rise in the roadway is immediately followed by a corresponding drop therein, as for example at a railway crossing, the lower casing may be forced first to its extreme upper limit, thus tightening the springs 38, 39 and 40, and then quickly rebound to its extreme lower limit and thereby loosen the springs a corresponding amount, with the net result that the adjustment of the springs will remain as it previously was. The normalizing pressure hereinabove referred to may be so proportioned as to slightly exceed the change in the pressure of the springs 38, 39 and 40 effected by the rotary movement of the ratchet 56 or 57 when forced from one to the other limit of its vertical movement. Accordingly, when the adjustment screw 30 has been turned sufficiently to restore the lower casing to its normal position within the upper casing the superior action of the normalizing pressure will tend to stop and to hold it there.

The spring 55 serves as a buffer, to prevent the undesirably great strain which otherwise might occasionally be put upon the weakest part of the adjusting mechanism. It is stiff enough to hold the actuating screw 53 against turning movement when either of the ratchets 56 or 57 is being actuated thereby to turn the adjustments screw 30. But it will yield so as to allow the screw 53 to turn a part of a revolution, in either direction, in case the adjustment screw reaches the limit of its movement and is there locked by the engagement of a pin 35 with a shoulder 36 while the ratchet engaged is still being forced along. The spring will return the actuating screw to its normal position as soon as permitted so to do by a movement of the lower casing in the opposite direction.

In the modification illustrated in Fig. 4 of the drawings, the racks 19ᵃ are integral with the upper casing 1ˢ. And for the gears 18 there are substituted rocking-levers 18ᵃ which at their outer ends carry gear-segments meshing with the racks 19ª and at their inner ends are united by a yoke 62ª carrying centrally thereof an extension lever-arm 11ª, which passes through an elongated slot in a cam-shaped guide-arm 62 projecting downwardly from the upper casing and is linked to the end of the leaf-spring on the axle, thus doing away with the lower casing and the racks 14 carried thereon. Here, the gear-segments are held in mesh with the racks by the guide-arm 62, and they and the inner cam surface of the guide-arm are so proportioned that the pivot-pins 25 will be shifted to and from the racks 19ª, respectively, as they are raised and lowered by the vertical movement of the arm 11ª, in the same way as before. The springs and spring-supporting and adjusting mechanism illustrated in the preceding figures may be used without change, and the device may be enclosed at the bottom, if desired.

In the further modification illustrated in Fig. 5, the racks 19ᵇ are formed as integral parts of the upper casing 1ᵇ, the racks 14ᵇ are connected by arms 11ᵇ to the end of the leaf-spring on the axle and move up and down therewith in suitable guide-ways (not shown) formed as part of the upper casing, and each of the two pairs of racks 14ᵇ and 19ᵇ is operatively connected through a train of four gears, namely, a gear 18¹ which is pivoted at 25¹ upon a supporting arm 26ᵇ carried by the cross-beam 29ᵇ and meshes with the racks 14ᵇ, an eccentric gear 18² which is also pivoted upon the pin 25¹ and is fixed to one side of the gear 18¹, a second eccentric gear 18³ which is pivoted by pin 25² on the supporting arm 26ᵇ and meshes with the eccentric gear 18², and a gear 18⁴ which is pivoted upon the pin 25² fixed to the side of gear 18³ and meshes with the rack 19ᵇ. The two eccentric gears 18² and 18³ here serve, in substantially the same way as do the gears 18 or the rocking-levers 18⁵, to change the leverage with which the racks 14ᵇ act on the racks 19ᵇ in raising or lowering the cross-beam 29ᵇ to compress or expand the springs 38, 39 and 40 (not here shown). These eccentric gears may, if desired, be oval or of deformed shape instead of circular.

Referring now to the further modification illustrated in Fig. 6, the enclosed casing 1ᶜ, which is rigidly attached to the body frame-member, carries a pivot 63 upon which is mounted a single lever-arm 64 which, providing an upper bearing surface, extends inwardly through a slot 65 in the inner wall of the casing and at its inner end is connected by a shackle 66 to the end of the axle-spring to move up and down therewith. An extension 67 of this lever-arm, projecting upwardly from the pivot 63, is slotted at its upper end and in this slot are mounted, upon a pin 68, two oppositely disposed ratchet-dogs 69 and 70 which are held by a spring 71 in operative engagement with the teeth of the ratchets 72 and 73, respectively. These two ratchets, as shown, are integral parts of a bar which is supported upon the ridged bottom of the slot in the extension 67, to slide thereon, and is pivoted at 74 to the rim of the spring seat 32ᶜ, which spring seat is supported by a roller 75 pivotally mounted therein upon the lever-arm and in turn supports the nested springs 38ᶜ and 39ᶜ, corresponding to the springs 38, 39 and 40, bearing at their upper ends against an upper spring seat 76 pivoted at 77 to the casing. These springs are supplemented by a spring 47ᶜ, corresponding to the spring 47, bearing at its upper end against the upper spring seat and at the lower end against the outturned flange 46ᶜ of the sleeve 45ᶜ, which sleeve carries at its upper end an inturned flange 44ᶜ adapted to operatively engage the head 52ᶜ of a bolt 50ᶜ fixed in a central boss 49ᶜ on the upper spring seat.

In this embodiment of the invention, as the axle-spring moves upward with respect to the casing, raising the lever-arm 64 and compressing the springs, the ratchet-dog 69 in engagement with the teeth of the ratchet 72 shifts the lower spring seat towards the pivot 63, thus so changing the leverage on which the springs act as to compensate for the changing pressure they exert; and, reversely, on the dropping of the axle-spring, the ratchet-dog 70 in engagement with the teeth of the ratchet 73 will shift the lower spring seat away from the pivot 63. The normalizing pressure referred to is here provided by the spring 47ᶜ which through the flange of sleeve 45ᶜ supplements the pressure of the springs 38ᶜ and 39ᶜ when the axle-spring is above its normal position as shown, but, on a drop thereof below such normal position, being held against further expansion by the engagement of the bolt-head 52ᶜ with the flange 44ᶜ of the sleeve is separated from the lower spring seat and so can no longer exert any pressure on the lever-arm. Furthermore, when as the lever-arm 64 is raised, the upper end of the ratchet-dog 69 contacts with the shoulder 78 on the casing it will be tripped and thereby disconnected from the ratchet 72, whereupon, the lever-arm 64 continuing to rise, the ratchet-dog 70 will slip one or more teeth on the ratchet 73, so that on the next downward movement of the lever-arm 64 the lower spring-seat 32ᶜ will be slightly shifted away from the pivot 63; and this action will be repeated as the lever-arm 64 is jiggled up and down until the average leverage upon which the springs normally act has been adjusted to meet the downward pressure of a supernormal body load. For adjustment to a body load below the normal, an adjustment of the leverage of the springs in the opposite direction is similarly effected by the tripping of the ratchet-dog 70 out of engagement with the ratchet 73 whenever it strikes the shoulder 79 on the casing.

In the form illustrated in Fig. 7 the device has been much simplified by the utilization, in place of springs or other elastic elements with their varying pressures under different degrees of compression, of the constant pressure of a weight. Here, a bracket 81, with arms 82 and 83, is rigidly attached to the body frame-member 3. To the end of the leaf-spring 13 is attached, by strap 84, the end of a cable 85 which passes over a sheave 86 pivotally mounted at the lower end of the arm 82 and at its other end is attached by a strap 87 to the pivot-pin of a sheave or sheaves 88. A second cable 89, attached at one end to the arm 83, is passed one or more times over the sheave or sheaves 88 and a sheave or sheaves 90 pivotally mounted at the end of the arm 83 and is attached at its free end to a weight 92. Through this weight a constant pressure is transmitted between the axle-spring 13 and the frame-member 3 whatever the position of one may be relative to the other. The weight being slightly less than that required to restore the parts to normal position after a rise of the axle-spring, the required normalizing pressure is supplied by a spring 47$^d$ which at its lower end bears upon a seat 48$^d$ provided by a projection on the arm 82 and at its upper end against a spring-seat 46$^d$ reciprocating up and down in guide-ways also provided by the arm 82 and normally held at the limit of its upward movement against fixed shoulders 52$^d$ in contact with the lower end of the strap 87. Thus, whenever the axle-spring 13 is above its normal position relative to the body frame-member 3 as shown, this spring will be compressed by the forced downward movement of the spring-seat 46$^d$, but, as the spring-seat is limited in its upward movement by the shoulders 52$^d$, the strap 87 will be separated therefrom and so receive no pressure from the spring whenever the axle-spring is below its normal position relative to the body frame-member.

It will of course be understood that the device may be still further modified in its several parts, as by the substitution of mechanical equivalents therefor, and that certain of its features as shown and described may be eliminated entirely if desired, without departing from the spirit or sacrificing the substantial advantages of the invention.

What I claim as new, and desire to secure by Letters Patent, is—

1. In a device of the character disclosed, the combination of pressure transmitting means connecting two parts while permitting a limited relative movement of one with respect to the other, means adapted to maintain substantially constant the pressure transmitted by the pressure transmitting means from one part to the other whatever their relative position may be, and means providing a normalizing pressure tending to restore to and to hold said parts in their normal spaced relationship one to the other whenever moved therefrom by abnormal pressure conditions.

2. A device of the character disclosed comprising pressure transmitting means for connecting two parts adapted to allow the parts a limited movement to and from each other, means for maintaining substantially constant the pressure transmitted at all positions of the parts relative to each other, and means tending normally to restore the parts to and to hold them in normal position relative to each other when moved therefrom.

3. A device of the character disclosed comprising means connecting two parts adapted to allow them a limited movement to and from each other and pressure transmitting means adapted to maintain substantially constant the pressure transmitted from one to the other part through one portion of the range of their movement and to transmit a somewhat different degree of pressure also substantially constant through the remaining portion of the range of their movement.

4. A device of the character disclosed comprising means connecting two parts adapted to allow a limited movement thereof to and from each other, pressure transmitting means adapted to maintain substantially constant the pressure transmitted from one to the other part through a given portion of the range of their movement, and means actuated by the movement of the parts through another portion of the range of their movement for adjusting the amount of pressure transmitted.

5. A device of the character disclosed comprising means for connecting together two parts adapted under normal pressures thereon to hold said parts in predetermined spaced relationship but permitting their movement to a limited extent to and from each other, pressure transmitting means adapted to maintain substantially constant the pressure transmitted from one to the other of said connected parts when said first part is moved by a change in the pressure thereon relatively to the other part, and automatic means operative to adjust the pressure transmitted by said pressure transmitting means to substantially accord with variations in the pressure on the other of said connected parts.

6. A device of the character disclosed comprising means yieldingly connecting together two parts and of a value slightly less than that required under normal pressures to maintain the parts at a predetermined fixed distance apart and supplemental means operative normally to hold the parts in such predetermined fixed relationship and tending to restore them to such position when moved therefrom.

7. A device of the character disclosed comprising means for connecting together two parts, including an elastic element, adapted to allow a limited movement of the parts to and from each other, means adapted to automatically effect a corresponding change in the tension of said elastic element under substantial changes in the pressure on one of said connected parts, and means adapted to maintain substantially constant the pressure transmitted to said connected part through the elastic element when variably compressed by varying changes in the pressure on the other connected part.

8. A device for connecting the body and running gear of a vehicle comprising means, including an elastic element, adapted to oppose to a normal body load a normal upward pressure upon the body, means adapted to maintain substantially constant such normal upward pressure upon the body under different degrees of compression of the elastic element due to changes in the vertical position of the running gear with respect to the body, and means operative under changes from normal in the body load to effect substantially corresponding changes in the opposed upward pressure on the body.

9. A device for connecting the body and running gear of a vehicle comprising an elastic element which has under a normal body load a pressure value slightly less than that required to maintain the body in normal position above the running gear and supplemental means adapted to supply such deficiency in the pressure value of the elastic element and normally operative to restore the body to its normal position relative to the running gear after a change in the vertical position of the latter.

10. A device for connecting the body and running gear of a vehicle comprising an elastic element which has under a normal body load a pressure value slightly less than that required to maintain the body in normal position above the running gear, supplemental means adapted to provide an upward pressure on the body slightly in excess of said deficiency in the pressure value of the elastic element when and only when the body is below its normal position relative to the running gear, and means adapted to absorb pressure changes due to changes in the vertical position of the running gear and thereby to prevent the transmission of any substantial part thereof to the body.

11. A pressure transmitting connection between two parts comprising an elastic element and arranged and operating in series therewith, means adapted to permit movement of one of the connected parts relative to the other without substantial change in the pressure transmitted.

12. In a device of the character disclosed, the combination of means for transmitting pressure between two parts which permit a movement of the parts one with respect to the other and means for changing the pressure transmitted at predetermined distances from each other.

13. In a device of the character disclosed, the combination of means for transmitting pressure between two parts which permit movement of either part with respect to the other without substantially changing the pressure transmitted, and means for maintaining said two parts at an approximately predetermined distance apart when the pressure transmitted is within predetermined limits.

14. In a device of the character disclosed, the combination of means for transmitting pressure between two parts which permit movement of either of said parts with respect to the other, means for maintaining said two parts at an approximately predetermined distance apart when the pressure transmitted is within predetermined limits, and means for changing the pressure transmitted when the parts are at a predetermined distance apart.

15. A shock absorber device for connecting the body and running gear of a vehicle comprising, in combination, a spring attached to one part of the vehicle, means for transmitting pressure between an end of said spring and the other part of the vehicle which permits movement of the parts towards or away from each other without substantially changing the pressure transmitted between them.

16. A shock absorber device for connecting the body and running gear of a vehicle comprising, in combination, a spring attached to one part of the vehicle and means for transmitting pressure between an end of said spring and the other part of the vehicle which permits movement of the parts towards or away from each other within predetermined limits without substantially changing the pressure transmitted between them.

17. A shock absorber device for connecting the body and running gear of a vehicle comprising, in combination, a spring attached to one part of the vehicle and means interposed between the spring and the other part of the vehicle whereby the pressure transmitted is controlled without constraining the action of the spring.

18. A shock absorber device for connecting the body and the running gear of a vehicle comprising, in combination, a spring attached to one part of the vehicle and means interposed between the spring and the other part of the vehicle whereby the pressure transmitted between the spring and the said other part of the vehicle is maintained substantially constant without substantially constraining the action of the spring.

19. A shock absorber device for connecting the body and running gear of a vehicle comprising a spring attached to one part of the vehicle and means for substantially counteracting the differences in the pressure exerted by the spring without substantially constraining its action.

20. In a shock absorber device for connecting the body and running gear of a vehicle, means including an elastic element and a system of levers permitting the movement of the body and running gear to and from each other within predetermined limits but maintaining substantially constant the pressure transmitted.

21. In a shock absorber device for connecting the body and running gear of a vehicle, means including a system of levers permitting a movement of the body and running gear to and from each other within predetermined limits but maintaining substantially constant the pressure transmitted.

LOUIS D. GREGG.